United States Patent [19]

Bos et al.

[11] Patent Number: 5,774,431

[45] Date of Patent: Jun. 30, 1998

[54] TABLE-OF-CONTENTS CACHING METHOD FOR STORED COMPACT DISCS

[75] Inventors: Eric Rene Bos, Fountain Valley; Robert L. Montelius, Jr., Laguna Hills, both of Calif.

[73] Assignee: MultiDisc Technologies, Newbury Park, Calif.

[21] Appl. No.: 790,561

[22] Filed: Jan. 29, 1997

[51] Int. Cl.[6] .................................................. G11B 17/22
[52] U.S. Cl. ........................................... 369/30; 369/33
[58] Field of Search ................................ 369/30, 34, 33, 369/36, 37, 38, 39, 32, 178

[56] References Cited

U.S. PATENT DOCUMENTS

| | | | |
|---|---|---|---|
| 4,527,262 | 7/1985 | Manto | 369/33 |
| 4,614,474 | 9/1986 | Sudo | 414/281 |
| 4,734,814 | 3/1988 | Fujino et al. | 360/133 |
| 4,855,980 | 8/1989 | Hug et al. | 369/36 |
| 5,020,043 | 5/1991 | Kohler | 369/36 |
| 5,022,019 | 6/1991 | Motoyoshi et al. | 369/36 |
| 5,036,503 | 7/1991 | Tomita | 369/36 |
| 5,041,929 | 8/1991 | Fryberger et al. | 360/92 |
| 5,146,451 | 9/1992 | Kang | 369/270 |
| 5,157,646 | 10/1992 | Amemiya et al. | 369/32 |
| 5,189,656 | 2/1993 | Masaki et al. | 369/47 |
| 5,195,066 | 3/1993 | Amemiya et al. | 369/32 |
| 5,197,056 | 3/1993 | Van Heusden et al. | 369/37 |
| 5,206,845 | 4/1993 | Baxter et al. | 369/34 |
| 5,210,728 | 5/1993 | Noguchi et al. | 369/36 |
| 5,214,628 | 5/1993 | Langman et al. | 369/37 |
| 5,216,645 | 6/1993 | Sakayama | 369/36 |
| 5,228,016 | 7/1993 | Menke | 369/36 |
| 5,235,579 | 8/1993 | Ross | 369/37 |
| 5,247,500 | 9/1993 | Miyoshi et al. | 369/38 |
| 5,255,251 | 10/1993 | Fitzgerald et al. | 369/36 |
| 5,263,010 | 11/1993 | Amemiya et al. | 369/33 |
| 5,267,225 | 11/1993 | Fukasawa et al. | 369/36 |
| 5,285,333 | 2/1994 | Barr et al. | 360/92 |
| 5,289,441 | 2/1994 | Domberg et al. | 369/34 |
| 5,327,412 | 7/1994 | Lee | 369/75.2 |
| 5,373,489 | 12/1994 | Sato et al. | 369/36 |
| 5,446,714 | 8/1995 | Yoshio et al. | 369/32 |
| 5,473,585 | 12/1995 | Kim | 369/36 |

FOREIGN PATENT DOCUMENTS

| | | |
|---|---|---|
| 542482 | 5/1993 | European Pat. Off. . |
| 589479A2 | 3/1994 | European Pat. Off. . |
| 4341968 | 11/1992 | Japan . |
| 68465 | 3/1994 | Japan . |
| 6195838 | 7/1994 | Japan . |

*Primary Examiner*—Tan Dinh
*Attorney, Agent, or Firm*—Stetina Brunda Garred & Brucker

[57] ABSTRACT

A method for enhancing access to CD-ROM's and the like stored in a magazine has the steps of: loading a CD-ROM into a CD-ROM reader; reading a table of contents from the CD-ROM; storing the table of contents in a non-volatile memory device; and storing the CD-ROM at a known location within the magazine. Data on the CD-ROM can thus subsequently be read without re-reading the table of contents thereof. Necessary information from the table of contents is retrieved from the non-volatile memory device.

7 Claims, 5 Drawing Sheets

TABLE-OF-CONTENTS CACHING METHOD FOR STORED COMPACT DISCS

FIELD OF THE INVENTION

The present invention relates generally to storage/autochanger systems for electronic media such as CD-ROM's and the like. The present invention relates more particularly to a method for enhancing access to data stored upon CD-ROM's and the like, by eliminating the need to re-read the table of contents of the CD-ROM each time data is to be read therefrom.

BACKGROUND OF THE INVENTION

Compact Discs for storing audio, i.e., music, speech, etc., are well known. Compact discs (commonly referred to as CD-ROM's) for storing and retrieving data, text, images, music, etc., are likewise well known. As such, discs are used to store and retrieve a wide variety of data types. Such discs provide a very high density storage media, and are thus desirable for storing large volumes of such data.

Storage/autochanger systems, i.e., jukeboxes, for facilitating selection of a desired one of a plurality of different recording media are also well known. For example, such storage/autochanger systems are commonly used to facilitate the selection of desired audio recordings.

More particularly, storage/autochanger systems for facilitating the selection of both CD's having audio data stored thereon and CD-ROM's having data stored thereon are known. Such disc jukeboxes commonly contain approximately 50 to 100 discs.

Contemporary storage/autochanger systems have proven generally suitable for their intended uses. However, as those skilled in the art will appreciate, such contemporary storage/autochanger systems suffer from inherent deficiencies which detract from their overall usefulness and desirability. For example, in audio CD and CD-ROM storage/autochanger systems, each time that a particular audio CD or CD-ROM is selected, then the table of contents for that particular audio CD or CD-ROM is read, so as to facilitate the reading of an audio track or data block therefrom. As those skilled in the art will appreciate, the time required to read the table of contents is substantial, particularly as compared to the total time required to access data from the CD-ROM. Thus it is desirable to minimize or eliminate the time required to read the table of contents, thereby substantially reducing the total time to access data stored upon the audio CD or CD-ROM.

As such, it would be desirable to provide a procedure for facilitating access to desired audio tracks and/or data blocks without requiring that the table of contents be read each time the audio CD or CD-ROM is loaded into the reader.

SUMMARY OF THE INVENTION

The present invention specifically addresses and alleviates the above-mentioned deficiencies associated with the prior art. More particularly, the present invention comprises a method for enhancing access to data stored upon CD-ROM's and the like, which are typically stored in a magazine or similar storage device.

As used herein, the term CD-ROM is defined to include all video discs, CD and CD-ROM devices, as well as any similar storage media for audio, data, etc. Indeed, it is contemplated that the methodology of the present invention may be utilized with various different types of devices wherein a table of contents must particularly be read prior to the reading of data from the device. As such, the term CD-ROM is further defined herein to include all such devices. This includes, but is not limited to DVD's (digital versatile disc). Further, as used herein, the term magazine is defined to include any system for storing a plurality of CD-ROM's or the like, including shelves, racks, stacking arrangements, etc. Yet further, as used herein, the term data block is defined to include audio tracks and any other addressable quantity of data stored upon a CD-ROM or the like.

As used herein, the term CD-ROM reader shall be defined to include any device capable of reading data, music, etc. from a CD, CD-ROM or CD-ROM like device, including but not limited to CD-ROM reader/writers.

The method for enhancing access to CD-ROM's and the like according to the present invention comprises the steps of loading a CD-ROM into a CD-ROM reader; reading a table of contents from the CD-ROM; storing the table of contents in a non-volatile memory device; and storing the CD-ROM at a known location, preferably within a magazine associated with the CD-ROM reader.

Data on the CD-ROM can thus subsequently be read without re-reading the table of contents thereof. Necessary information from the table of contents, such as that required for positioning CD-ROM optics at the lead-in for a desired data block, is retrieved from the non-volatile memory device, rather than reading it directly from the CD-ROM.

Thus, according to the methodology of the present invention, the step of storing the table of contents preferably comprises storing the table of contents on a hard drive or other such secondary storage such that it may readily and quickly be retrieved therefrom as required.

After the table of contents is read from the CD-ROM, it is preferably temporarily stored in a host allocated buffer memory, prior to the step of storing the table of contents in the non-volatile memory device. The steps of loading a CD-ROM into a CD-ROM changer; reading a table of contents from the CD-ROM; storing the table of contents in a non-volatile memory device; and storing the CD-ROM at a known location within the magazine are all preferably performed under the control of a common microprocessor or alternately, under coordinated distributed control. These steps are all performed in preparation for later reading of the CD-ROM when data is desired which is located upon one or more data blocks thereof.

According to the preferred embodiment of the present invention, the microprocessor assigns a storage location in the magazine to the CD-ROM and then stores an address representative of the CD-ROM's storage location in a database. Similarly, the microprocessor assigns a storage location in the non-volatile memory device to the table of contents and stores the address of the table of contents storage location in a database, optionally the same database as that in which the storage location addresses are stored. Thus, a desired CD-ROM and its associated table of contents are retrievable so as to facilitate reading of data stored upon the CD-ROM utilizing the retrieved table of contents, rather than utilizing the contemporary and substantially slower methodology of rereading the table of contents from the CD-ROM each time that data is to be retrieved therefrom.

The step of loading a CD-ROM into a CD-ROM reader preferably comprises adding a new CD-ROM to the system. Alternatively, a CD-ROM which has previously been loaded into the system may be loaded into the CD-ROM reader so as to facilitate either initial or re-reading of the table of contents thereof.

Thus, reading of the table of contents from a CD-ROM may be deferred during the initial loading process until a later time, when it is more convenient or desirable to do so. For example, if a user has a large number of CD-ROM's to load into the storage/autochanger system, then it may be more expeditious to load each CD-ROM, in turn, into its desired storage location, and then use an automated procedure to move each CD-ROM from its storage location to the CD-ROM reader, so as to facilitate reading of the table of contents thereof. Of course, the table of contents of each CD-ROM may alternatively be read when it is initially loaded into the storage/autochanger system.

Alternatively, reading of the table of contents and storing it in secondary memory may be deferred until the first time that a request for the data stored upon a disc is made. Thus, the first time that the disc is read, during a routine data request, the table of contents is read therefrom and stored in secondary memory such that when data stored upon the disc is again required, the table of contents stored in secondary memory may be utilized. During such operation, the system detects that a table of contents has not previously been cached for the particular disc being read, and the table of contents is then read from the disc in the same manner that occurs when the table of contents is dropped or missing, as described in detail below.

Since it is possible that the table of contents data stored in the non-volatile memory device may, at some time, become corrupted, or that a CD-ROM may be removed from its registered storage location to a different storage location, such that the computer is no longer aware of the proper storage location of the CD-ROM, it may become necessary to update the table of contents information after the initial storage thereof in the non-volatile memory device.

For example, if a CD-ROM is loaded into the CD-ROM reader and a table of contents stored upon the non-volatile memory device is utilized in an attempt to read a data block from the CD-ROM, but the attempt fails, then the table of contents is re-read from the CD-ROM and re-stored in the storage media. As those skilled in the art will appreciate, failure to properly read a data block may occur when the table of contents stored on the non-volatile memory device is corrupted, or is not that specific table of contents associated with the particular CD-ROM being read, possibly due to the storage of a different CD-ROM at a given location. That is, the CD-ROM storage location address may be incorrect, i.e., it does not match the CD-ROM actually stored at a given location. This is likely to occur when, for example, an operator inadvertently inserts a CD-ROM into the wrong storage location, such as during routine maintenance or repair, etc.

Thus, data is retrieved from a desired CD-ROM by loading that CD-ROM into the CD-ROM reader from the magazine while simultaneously retrieving the table of contents for the CD-ROM loaded into the CD-ROM reader from the non-volatile memory device, using the table of contents retrieved from the non-volatile memory device to determine the data block(s) on the CD-ROM where the desired data is stored, and then reading the desired data from the CD-ROM block(s) on the CD-ROM where it is stored.

The microprocessor verifies that the data block(s) where the desired data is located conforms to the table of contents, so as to verify the validity of the table of contents. This is preferably accomplished by verifying that the table of contents does, indeed, point to the desired data block. The table of contents is re-read from the CD-ROM when the data block(s) do not conform to the table of contents. As discussed above, non-conforming data block(s) indicate that the desired CD-ROM may not have been at the proper magazine location or that the table of contents stored on the non-volatile memory device may have been corrupted.

These, as well as other advantages of the present invention, will be more apparent from the following description and drawings. It is understood that changes in the specific structure shown and described may be made within the scope of the claims without departing from the spirit of the invention.

DETAILED DESCRIPTION OF THE PREFERRED EMBODIMENT

The detailed description set forth below in connection with the appended drawings is intended as description of the presently preferred embodiment of the invention and is not intended to represent the only form in which the present invention may be constructed or utilized. The description sets forth the functions and the sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

Figure 1:
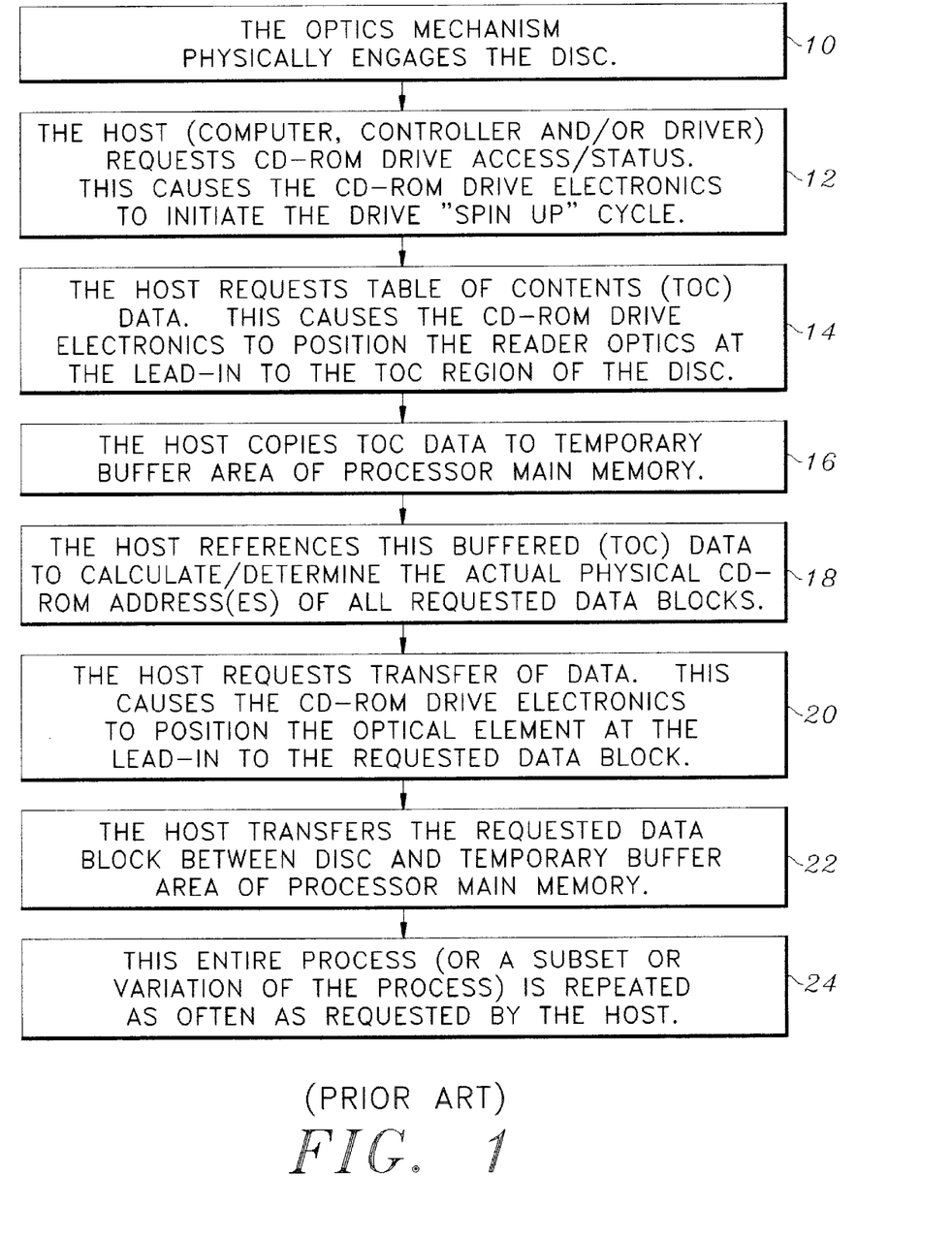
FIG. 1 is a flow chart showing the methodology for accessing data on a CD-ROM according to contemporary methodology.
Figure 2:
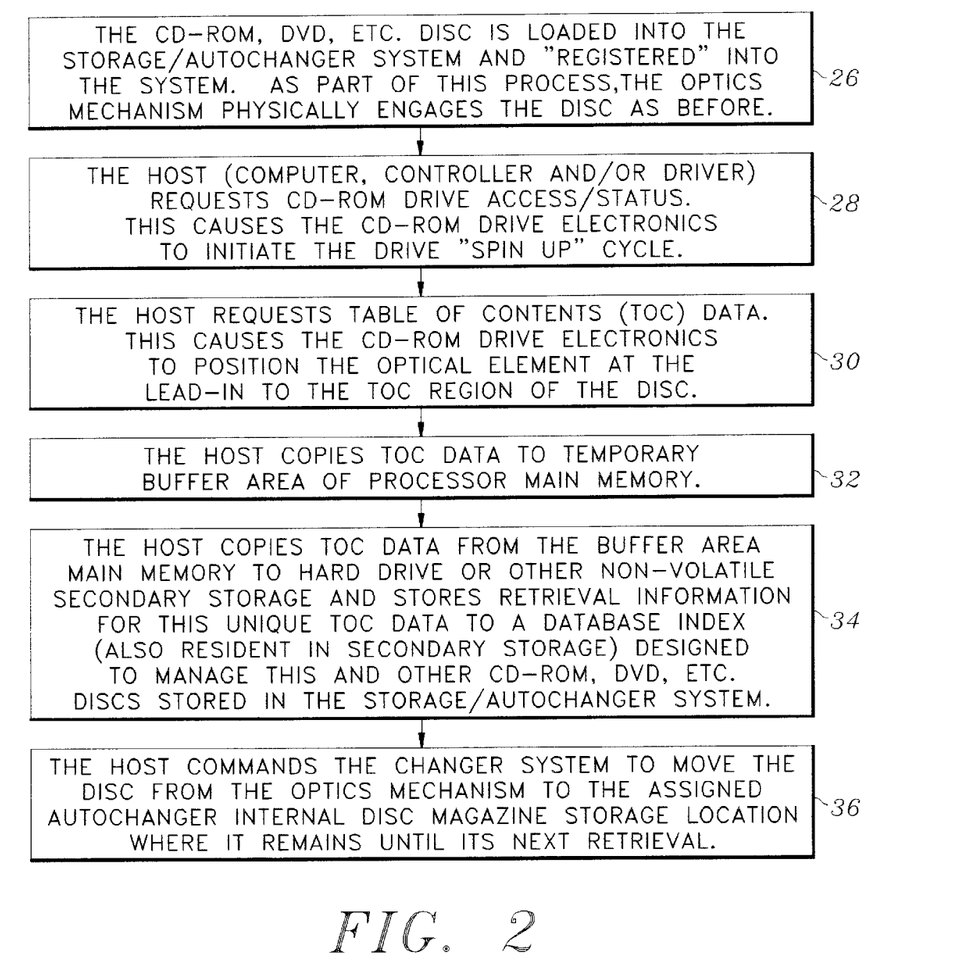
FIG. 2 is a flow chart showing the methodology for accessing data on a CD-ROM according to the present invention.
Figure 3:
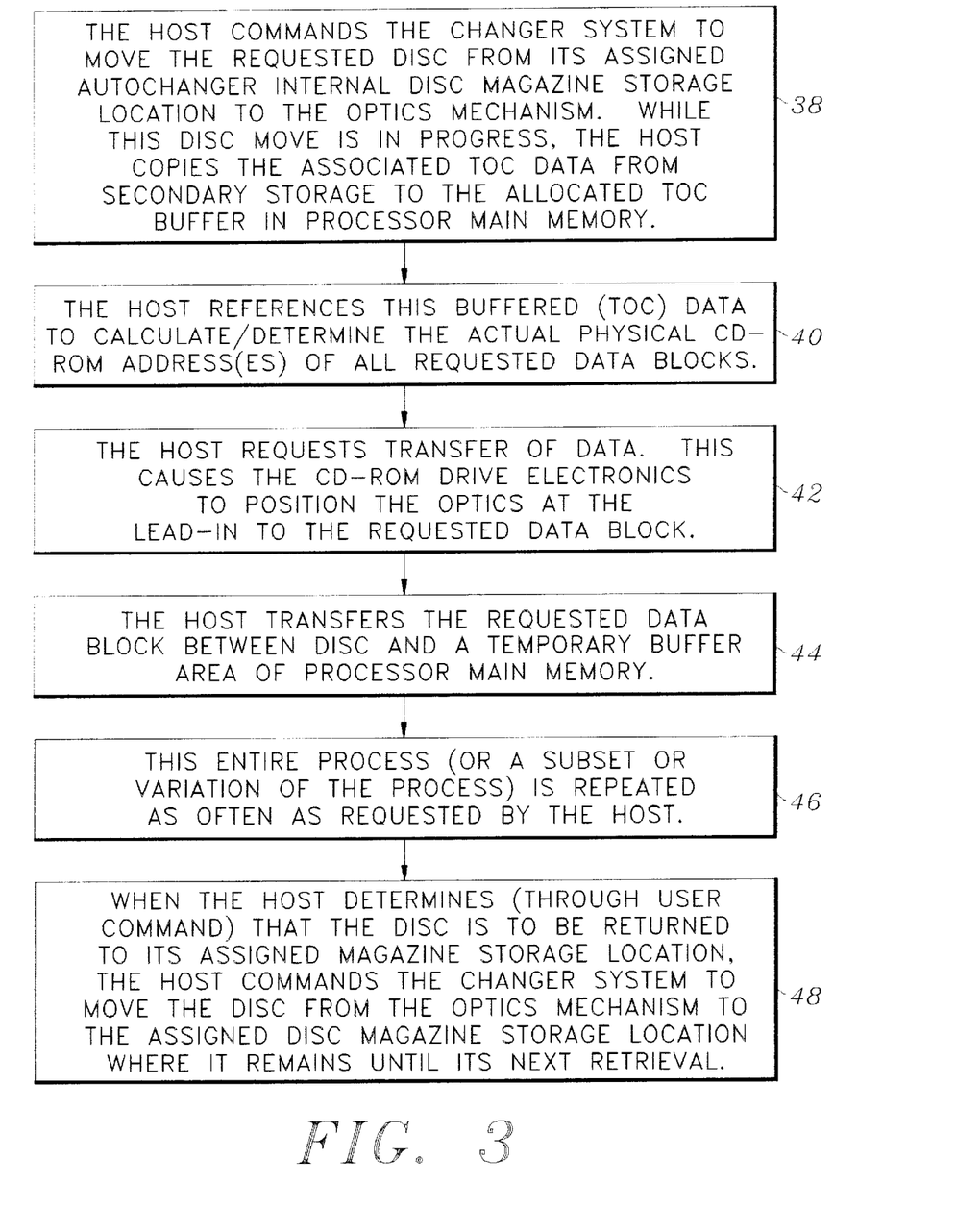
FIG. 3 is a flow chart showing table of contents caching in further detail.
Figure 4:
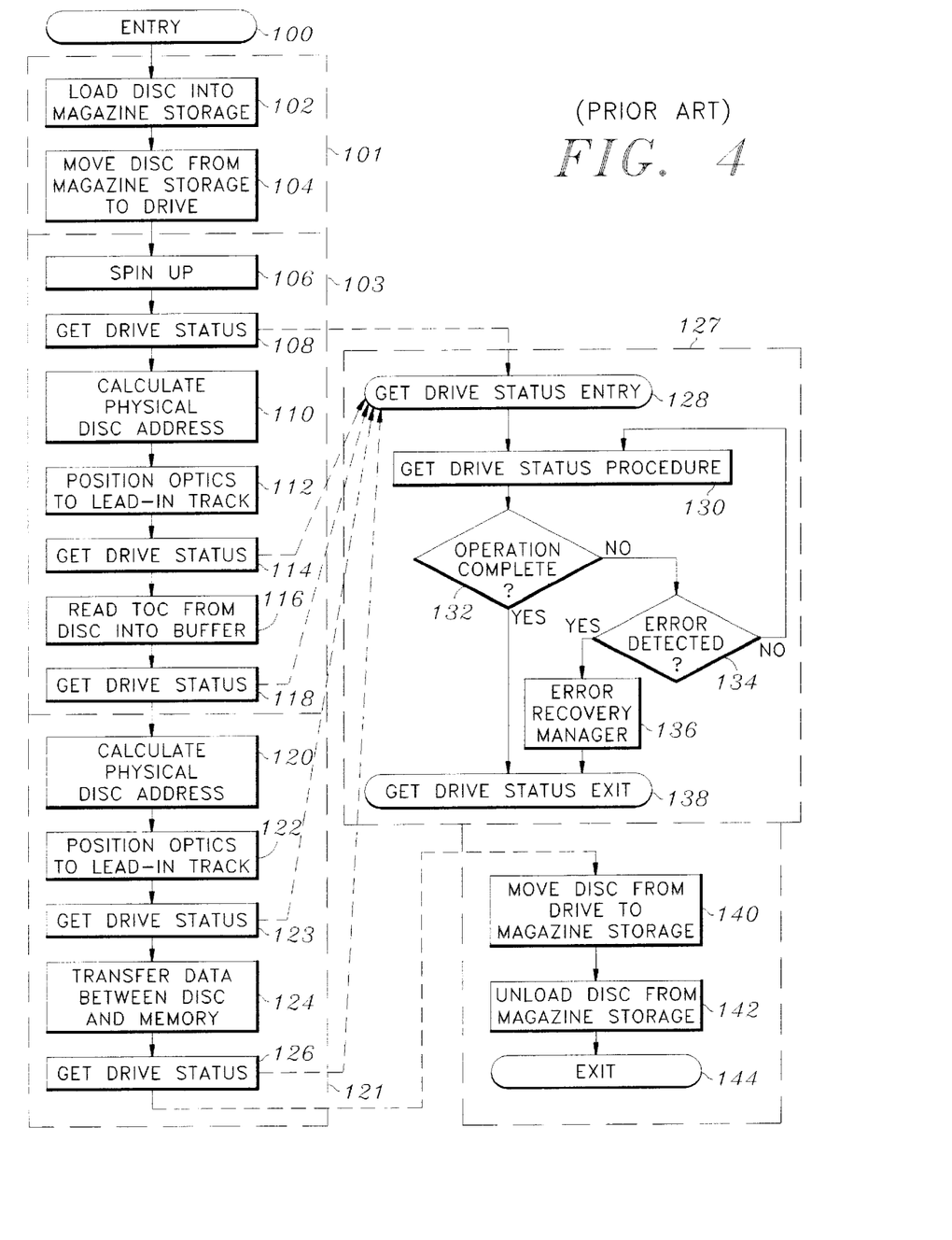
FIG. 4 is a flow chart showing CD-ROM data access according to contemporary methodology in further detail.
Figure 5:
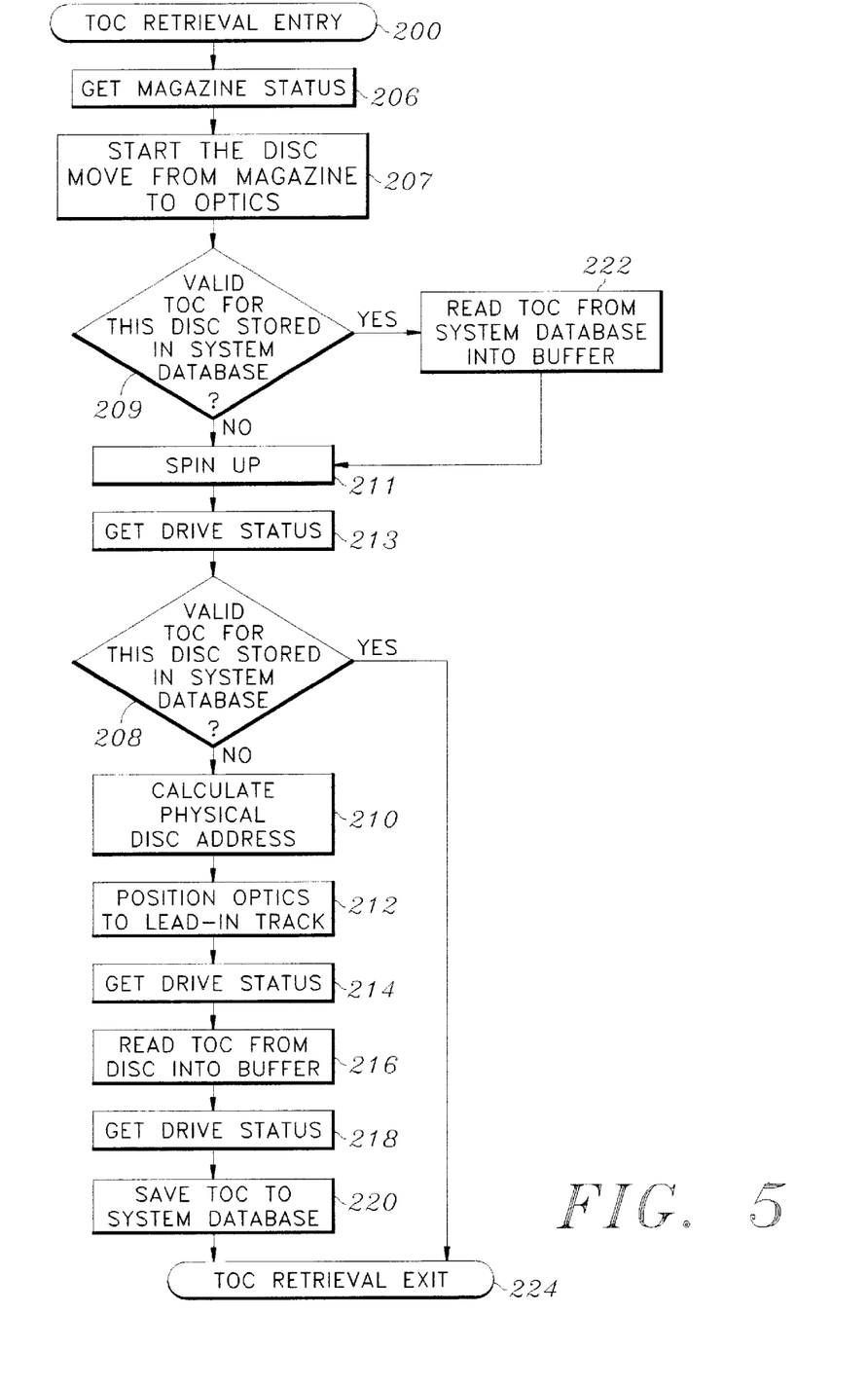
FIG. 5 is a flow chart showing CD-ROM data access according to the present invention in further detail.

The methodology of the present invention is illustrated in FIGS. 2, 3, and 5 which depict a presently preferred embodiment thereof. FIGS. 1 and 4 depict prior art methodology.

The present invention comprises a method for enhancing access to CD-ROM's and the like, which are typically stored in a magazine or similar storage device. According to the methodology of the present invention, the table of contents of each CD-ROM is typically only read once and then stored in a non-volatile memory device, such that it need not be re-read each time data from the CD-ROM is accessed.

Thus, according to the present invention, the data retrieval process from a CD-ROM or the like is substantially enhanced since the table of contents can be copied from secondary memory to a temporary buffer of the main memory in a shorter amount of time than it takes to physically move the disc from its magazine storage location to the disc reader. Because of this, the table of contents does not have to be read from the disc after it is engaged by the disc reader optics and the time required to access the desired data stored upon the disc is thereby substantially reduced.

Thus, rather than spending a substantial amount of time re-reading the CD-ROM's table of contents for each data access, the table of contents is simply read from the non-volatile storage device, preferably into a host computer's temporary buffer, and then utilized to facilitate access to data stored upon the CD-ROM.

Referring now to FIG. 1, according to prior art methodology, first the optics mechanism physically engages 10 the disc. Next, the host requests CD-ROM drive access/ status, thereby causing the CD-ROM drive electronics to initiate 12 the drive spin up cycle. As those skilled in the art will appreciate, the host may comprise a computer, controller, driver, or similar device.

Next, the host requests 14 table of contents data. This causes the CD-ROM drive electronics to position the reader optics at the lead-in to the table of contents region of the disc. Table of contents data is needed by the host in order to determine the actual physical address of the requested blocks of data.

Next, the host copies 16 the table of contents data to a temporary buffer area of the processor main memory. The host then references 18 this buffered table of contents data in order to calculate or determine the actual physical CD-ROM addresses for all of the requested data blocks. This allows the host to request 20 transfer of data, as desired. Such transfer of data requires that the CD-ROM drive electronics position the optics of the CD-ROM reader at the a lead-in to the requested data block. Once the optics has been positioned to the lead-in to the requested data block, then the host transfers 22 the requested data block between the disc and a temporary buffer area of the processor main memory. This process is repeated 24, as required by the host.

The time required for the CD-ROM drive to position the optics to the lead-in of the table of contents area of the disc, locate, and transfer the table of contents data to the host buffer memory is referred to herein as the table of contents access latency. These actions may be initiated either by the host or by internal firmware of the CD-ROM electronics each time that a CD-ROM disc is physically engaged by the optics mechanism of the reader.

It is a goal of the present invention to substantially eliminate the table of contents access latency so as to enhance the performance of a CD-ROM storage/ autochanger system. According to the present invention, the table of contents access latency is substantially eliminated for disc reads except for an initial loading of the CD-ROM into the storage/autochanger system, wherein the table of contents is read from the CD-ROM and stored in the non-volatile memory device; and, in the event that the table of contents becomes invalid, such as when it is corrupted or a disc is moved such that a valid table of contents is no longer associated therewith.

Referring now to FIG. 2, the CD-ROM, DVD (digital versatile disc), etc., disc is loaded 26 into the storage/ autochanger system and registered into the system. As a part of this process, the optics mechanism physically engages the disc as before. According to the methodology of the present invention, three procedures are utilized to achieve real-time elimination of the table of contents access latency. These three procedures are as follows: (1) the initial physical loading of the disc into the storage/autochanger system event; (2) the CD-ROM disc data access event; and (3) the re-acquire table of contents data event. The re-acquire table of contents data event is a recovery procedure which is utilized if the system ever determines that the table of contents for the current CD-ROM being read is either invalid or not properly cached.

Prior to being accessed by the storage/autochanger system, the CD-ROM or DVD, etc. must be physically loaded and registered into the storage/autochanger system. During this loading process, the table of contents is accessed and transferred to the host allocated buffer memory from where it is copied to permanent storage in the host's secondary storage system, which, according to the preferred embodiment of the present invention, comprises a hard disk or other non-volatile storage device. Retrieval information for this unique table of contents data is stored to the same secondary storage in the changer database disc management indexing system.

When a disc is requested from the changer system, the stored table of contents associated with the requested disc is copied from secondary storage into a main memory allocated buffer, and is thus available for access prior to the actual physical loading of the disc to the optics mechanism.

The host requests 28 CD-ROM drive access/status. This causes the CD-ROM drive electronics to initiate the drive spin up cycle.

The host requests 30 table of contents data. This causes the CD-ROM drive electronics to position the optics at the lead-in to the table of contents region of the disc. The host copies 32 table of contents data to a temporary buffer area of the processor main memory.

The host copies 34 table of contents from the buffer area of the main memory to the hard drive or other non-volatile memory device and stores retrieval information for this unique table of contents data to a database index which is also preferably resident in the secondary storage and is designed to manage this and other CD-ROM, DVD, etc. discs stored in the storage/autochanger system.

The host commands 36 the changer system to move the disc from the optics mechanism to the assigned autochanger internal disc magazine storage location, where it remains until it is required for a data access.

Referring now to FIG. 3, the CD-ROM disc data access event is shown. According to the methodology of the present invention, when a disc is requested from the storage/ autochanger, the stored table of contents associated with the requested disc is simultaneously copied from secondary storage, e.g., non-volatile storage, into a main memory allocated buffer and is therefore preferably available for access prior the actual physical loading of the disc to the reader mechanism. Once the disc is engaged by the optics mechanism, the CD-ROM positions the optics and begins the requested data transfer between the disc and the host.

Such operation substantially eliminates the table of contents access latency and thus substantially enhances CD-ROM data access. More particularly, the host commands 38 the storage/autochanger system to move the requested disc from its assigned magazine storage location to the disc reader. While the disc move is in progress, the host copies the associated table of contents data from the secondary storage to the allocated table of contents buffer in processor main memory.

The host references 40 this buffer table of contents data to calculate or determine the actual physical CD-ROM address of all requested data blocks. The host requests 42 transfer of data. This causes the CD-ROM drive electronics to position the optics at the lead-in to the requested data block. The host transfers 44 the requested data block between the CD-ROM and a temporary buffer area of the processor main memory. This entire process is repeated 46 as often requested by the host.

When the host determines 48 that the disc is to be returned to its assigned magazine storage location, the host then commands the changer system to move the disc from the optics mechanism to the assigned disc magazine storage location, where it remains until its next use.

The re-acquire table of contents data event is a recovery procedure required if the host system determines that the table of contents for the current CD-ROM is either invalid or not cached. It is expected that the re-acquired table of contents data event will occur only infrequently, since it is only necessary when either the table of contents data has been corrupted or the wrong disc has been retrieved, such as may result when discs are misplaced or swapped within the storage area therefor. As mentioned above, this is only likely to occur during manual intervention, such as when discs are moved around so as to facilitate routine maintenance and/or repair. When such an occurrence takes place, then the registration procedure of FIG. 2 is repeated, so as to acquire valid table of contents data for each CD-ROM, if necessary. Of course, when a re-acquired table of contents data event occurs, then the table of contents access latency is not mitigated.

Referring now to FIG. 4, a more detailed description of the prior art methodology for facilitating CD-ROM data access is provided.

The prior art process generally comprises robotics operation 101 which facilitates the adding of discs to the system and/or moving discs from the magazine storage to the system drives. It also generally comprises drive initialization and table of contents retrieval 103 into table of contents buffer. According to contemporary methodology, each time that a disc is loaded into or engaged by the drive optics mechanism, the drive goes through its initialization procedure and must locate and read the table of contents into a temporary buffer. This introduces the table of contents access latency described above.

Disc data access and transfers initiated by the host in response to user request 121 occur after the table of contents has been read into the buffer. The table of contents thus can be accessed by the host in response to each user request. This process is repeated as often as required until the disc is disengaged and/or removed from the drive optics mechanism.

According to contemporary methodology, after entering 100 the process, the disc is loaded 102 into the magazine storage/autochanger system. In order to access data stored upon the disc, the disc is moved 104 from the storage magazine to the CD-ROM reader or drive.

Further regarding the drive initialization and table of contents retrieval 103, the disc must first be spun up 106. Then, the drive status is accessed 108 and the physical disc address is calculated 110 or determined, so as to facilitate the reading of data therefrom.

Next, the optics are positioned 112 to the lead-in track of the table of contents to be read. The drive status is again queried 114. Then, the table of contents is read 116 from disc into buffer. Next, the drive status is again queried 118.

Further regarding the disc access and transfers 121 which are initiated by the host in response to user requests, the physical disc address for such data transfer is obtained 120. Next, the optics are positioned 122 to the lead-in track of the data block. The drive status is queried 123 and the transfer 124 of data between the disc and memory is commenced. The drive status is again queried 126.

Each time the drive status is queried as in the GET DRIVE STATUS calls 108, 114, 118, 123, and 126, the GET DRIVE STATUS ENTRY 128 control entry point is taken and the GET DRIVE STATUS PROCEDURE or system call is invoked thereby 130. Next, if the operation (for which status is being checked) is complete 132, the GET DRIVE STATUS EXIT 138 control exit point is taken, and execution control is returned back to the calling function. Otherwise, a check is made for errors 134. If no errors are detected then the get drive status 130 is repeated. If an error is detected, then error recovery 136 commences. The GET DRIVE STATUS EXIT 138 returns control to the step following the GET DRIVE STATUS call 108, 114, 118, 123, or 126 which initiated the GET DRIVE STATUS ENTRY 128. Thus, the drive status procedure 127, comprising steps 128–138 is a procedure or subroutine which is called (i.e., to which control of execution is transferred) by the GET DRIVE STATUS calls 108, 114, 118, 123, and 126.

At the appropriate host determined point in time, subsequent to completion of data access, the disc is moved to storage magazine 140 and optionally, this or another disc is unloaded from the magazine storage/autochanger system 142, prior to exiting 144.

Referring now to FIG. 5, according to the methodology of the present invention, drive initialization and table of contents retrieval into a table of contents buffer comprises utilizing table of contents caching. Thus the table of contents is located and copied into a temporary buffer only if the table of contents has not previously been copied into the system database in the secondary storage or if the database copy has been determined to be invalid or does not match the disc being accessed. Utilizing the cached database substantially (typically eliminates) reduces table of contents access latency.

Thus, according to the present invention, the table of contents retrieval 200 commences by first checking magazine status 206, which comprises obtaining the status of the stored discs database information including the location of the table of contents therefore. The disc move is started 207 so as to transport the disc from the magazine to the optics of the CD-ROM reader. If the table of contents for the selected disc is valid 209, then the table of contents is read directly from the secondary storage or database into the temporary buffer of the main memory 222. Otherwise, the table of contents must be re-acquired from the CD-ROM. In either instance, the disc is spun up 211 and the drive status retrieved 213. After the drive status has been retrieved 213 verifying 'spin up completion', then if a valid table of contents 208 has been retrieved from the secondary storage and stored in the temporary buffer, then table of contents retrieval is over and is exited 224. Otherwise, the table of contents is re-acquired.

To re-acquire the table of contents, the physical address is first calculated 210, the optics are then positioned 212 to the lead-in track of the CD-ROM, and the drive status queried 214 verifying 'on track' and 'lead-in within range'. Then the table of contents is read from the disc into the main memory temporary buffer 216 and the drive status is again queried. After reacquiring the table of contents it is again saved to the database 220. Then the table of contents retrieval process is exited 224.

In this manner, the table of contents is retrieved from secondary storage during the process of moving the requested disc from the magazine storage to the optics mechanism of the CD-ROM reader. The physical address of the data block is then calculated while the physical move of the disc is still in progress. This process is almost always completed prior to the disc being engaged by the optics. After the disc has been engaged by the optics, it is spun up and then is ready for positioning the optics to the predetermined physical address of the requested data block.

As discussed in detail above, there are two instances in which re-reading of the table of contents from the disc may be required. The first case is when no table of contents is associated with a particular magazine storage location and the second case is when a table of contents is associated with its particular storage location but is corrupt or does not result in accessing the expected data by the disc reader.

It is important to note that there is no fixed time delay between copying of the stored table of contents to the temporary buffer of the main memory 222 and the physical loading of the disc to the optics of the disc reader, including the time required for spin up of the disc. That is, retrieval of the stored table of contents happens simultaneously along with the mechanical actions required to move the disc from the magazine to the disc reader optics or alternately, prior to the commencement of such mechanical actions. Storage of the table of contents in the temporary buffer of the main memory 222 is generally complete prior to completion of the disc loading process. Thus, table of contents latency is almost always reduced to zero when a valid, stored table of contents exists within the secondary storage or database.

It is understood that the exemplary methodology described herein and shown in the drawings represents only a presently preferred embodiment of the invention. Indeed, various modifications and additions may be made to such embodiment without departing from the spirit and scope of the invention. For example, as those skilled in the art will appreciate, various different means for storing the table of contents and the database entry associated therewith are suitable. Although it is preferred that non-volatile storage be utilized, indeed, it is contemplated that various volatile memory storage devices may likewise be utilized. Also, it is contemplated that the methodology of the present invention may be utilized with various different types of storage media, and thus may not be limited to CD-ROM like devices. Thus, these and other modifications and additions may be obvious to those skilled in the art and may be implemented to adapt the present invention for use in a variety of different applications.

What is claimed is:

1. A method for enhancing access to a CD-ROM stored in a magazine, the method comprising the steps of:
    a) loading a CD-ROM into a CD-ROM reader;
    b) reading a table of contents from the CD-ROM;
    c) storing the table of contents at a known location in a non-volatile memory;
    d) storing the CD-ROM at a known location within a magazine;
    e) correlating for substantially simultaneous retrieval the location of the table of contents and the location of the CD-ROM;
    f) retrieving the table of contents and the CD-ROM to the CD-ROM reader; and
    g) accessing the contents of the CD-ROM through employment of the retrieved table of contents without re-reading from and confirming the table of contents of the CD-ROM.

2. The method as recited in claim 1 wherein the step of storing the table of contents comprises storing the table of contents on a hard disk.

3. The method as recited in claim 1 further comprising the step of temporarily storing the table of contents read from the CD-ROM in a host allocated buffer memory prior to the step of storing the table of contents in the non-volatile memory.

4. The method as recited in claim 1 wherein steps a) through d) thereof are performed under the control of a common microprocessor.

5. The method as recited in claim 1 wherein the step of loading a CD-ROM into a CD-ROM reader comprises loading an additional CD-ROM.

6. The method as recited in claim 1 wherein the step of accessing the contents of the CD-ROM comprises:
    a) using the table of contents retrieved from the non-volatile memory to determine a physical address on the CD-ROM of a requested data block;
    b) retrieving the data block to the CD-ROM reader; and
    c) reading the data block.

7. A method for enhancing retrieval speed of data stored on a CD-ROM in a storage/autochanger system, the method comprising the steps of:
    a) loading a CD-ROM into the system;
    b) assigning a storage location to the CD-ROM in a storage magazine of the system;
    c) storing in a data base an address of the storage location of the CD-ROM;
    d) reading a table of contents from the CD-ROM;
    e) storing the table of contents to a temporary buffer;
    f) copying the table of contents from the temporary buffer to a non-volatile memory;
    g) moving the CD-ROM to the storage location assigned thereto;
    h) moving the CD-ROM from the storage location to the CD-ROM reader when data stored thereon is to be retrieved;
    i) copying the table of contents for the CD-ROM from the non-volatile memory to the temporary buffer;
    j) using the table of contents to determine at least one data block on the CD-ROM where the data is stored; and
    k) reading the data of the data block(s) without re-reading from and confirming the table of contents of the CD-ROM.

* * * * *